US010275193B2

(12) United States Patent
Nishiwaki et al.

(10) Patent No.: US 10,275,193 B2
(45) Date of Patent: Apr. 30, 2019

(54) PRINTING DEVICE AND INFORMATION COLLECTION AND TRANSMISSION METHOD

(71) Applicant: SEIKO EPSON CORPORATION, Tokyo (JP)

(72) Inventors: Kazuya Nishiwaki, Matsumoto (JP); Kyoichi Kamijima, Shiojiri (JP); Hiroyuki Suzuki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/915,929

(22) Filed: Mar. 8, 2018

(65) Prior Publication Data

US 2018/0267752 A1 Sep. 20, 2018

(30) Foreign Application Priority Data

Mar. 16, 2017 (JP) ................................. 2017-050921

(51) Int. Cl.
*H04N 1/04* (2006.01)
*G06F 3/12* (2006.01)
*H04L 29/08* (2006.01)
*H04N 1/00* (2006.01)

(52) U.S. Cl.
CPC ............ *G06F 3/1232* (2013.01); *G06F 3/121* (2013.01); *G06F 3/1273* (2013.01); *G06F 3/1286* (2013.01); *G06F 3/1291* (2013.01); *H04L 67/1051* (2013.01); *H04N 1/00206* (2013.01); *H04N 1/00244* (2013.01)

(58) Field of Classification Search
CPC ............ H04N 1/00206; H04N 1/00244; G06F 3/1232; G06F 3/121; G06F 3/1273; G06F 3/1291; G06F 3/1286

USPC ......................................................... 358/1.15
See application file for complete search history.

(56) References Cited

U.S. PATENT DOCUMENTS

| | | | |
|---|---|---|---|
| 2004/0010588 A1* | 1/2004 | Slater | H04L 29/06027 709/224 |
| 2007/0043844 A1 | 2/2007 | Sakai | |
| 2013/0002752 A1* | 1/2013 | Shiraiwa | G06Q 30/04 347/19 |
| 2016/0286060 A1* | 9/2016 | Lee | H04N 1/00347 |

FOREIGN PATENT DOCUMENTS

JP 2006-163795 A 6/2006

OTHER PUBLICATIONS

Extended European Search Report dated Jul. 10, 2018 in related European Appl. 18162040.2 (7 pgs.).

* cited by examiner

*Primary Examiner* — Houshang Safaipour
(74) *Attorney, Agent, or Firm* — Foley & Lardner LLP (57) ABSTRACT

When a problem occurs in a subset of devices, another device appropriately executes a process instead of the problem device. A printer has a decision unit that determines whether or not a request for specific information was received at a specific time from a specific printer; an information collection device that, when the request is not received at the specific time, collects the specific information of each printer from other printers capable of communicating; and an information transmission device that transmits the specific information that was collected and the specific information about the printer of which it is part to an external server.

11 Claims, 4 Drawing Sheets

PRINTING DEVICE AND INFORMATION COLLECTION AND TRANSMISSION METHOD

CROSS-REFERENCE TO RELATED APPLICATION

This application claims priority from Japanese Patent Application No. 2017-050921, filed Mar. 16, 2017. The contents of which are incorporated herein by reference in its entirety.

BACKGROUND

1. Technical Field

The present invention relates to a printing device and an information collection and transmission method.

2. Related Art

Device selection systems in which one of multiple printers connected to a network, referred to below as the representative printer, provides specifications such as the functions and performance of itself and other printers in the network to a client are known from the literature. See, for example, JP-A-2006-163795.

When the representative printer in this system becomes unable to provide information to the client due to a problem with the representative printer, information about the other printers is not provided to the client.

SUMMARY

The invention is directed to solving this problem, and provides a printing device that, when a problem or error occurs in a particular device, appropriately executes a process in place of the particular device, and an information collection and transmission method.

One aspect of the invention is a printing device including an information collection device configured to collect from other printing devices specific information about each printing device when a request for the specific information is not received from a specific printing device at a specific time; and an information transmission device configured to transmit the specific information that was collected and the specific information about the printing device of which it is part to an external server.

When specific information cannot be collected from other printing devices because a problem occurred in a specific printing device, this configuration enables another printing device to collect the specific information from the other printing devices and send the collected information to an external server.

In a printing device according to another aspect of the invention, when the request is not received at the specific time, the information collection device queries the server whether or not the specific information was transmitted from the specific printing device to the server, and when a reply that the specific information was not transmitted from the specific printing device to the server is received from the server, collects the specific information.

After confirming that the specific printing device did not send the specific information to the server, this configuration enables another printing device to collect the specific information from other printing devices.

In a printing device according to another aspect of the invention, when the request is not received at the specific time, the information collection device declares to other printing devices that the information collection device will transmit information to the server, and then queries the server.

This configuration prevents multiple printing devices other than the specific printing device from each querying the server in the same way.

In a printing device according to another aspect of the invention, when the information collection device receives from the server a reply that the specific information was not transmitted, the information collection device declares to other printing devices that the information collection device will transmit information to the server, and then collects the specific information.

This configuration prevents multiple printing devices other than the specific printing device from each starting to collect the specific information in the same way.

In a printing device according to another aspect of the invention, the specific information is information used to calculate an invoice amount; and the information collection device collects the specific information of another printing device in the same group of printing devices for which an invoice amount is calculated and to which the information collection device belongs.

This configuration enables one printing device other than the specific printing device to collect and send to a server information used to calculate an invoice amount related to a group of multiple printing devices that are invoiced as a group.

In a printing device according to another aspect of the invention, the information transmission device, when unable to communicate with the server, requests another printing device in the same group that can connect communicatively with the server to collect the specific information.

If there is one printing device that can communicatively connect with the server, this configuration enables transmitting the specific information to the server.

The technical concept of the invention can also be achieved by embodiments in categories other than a device. For example, the invention may also be expressed as an information collection and transmission method executed by a printing device, and including: a decision step of determining whether or not a request for specific information was received at a specific time from a specific printing device; an information collection step of, when the decision step determines the request was not received at the specific time, collecting the specific information of each printing device from other printing devices able to communicate; and an information transmission step of transmitting the specific information that was collected to an external server.

The invention can also be embodied as a program causing hardware (a computer) to execute the method, and as a computer-readable storage medium storing the program.

Other objects and attainments together with a fuller understanding of the invention will become apparent and appreciated by referring to the following description and claims taken in conjunction with the accompanying drawings.

DESCRIPTION OF EMBODIMENTS

Preferred embodiments of the present invention are described below with reference to the accompanying figures. Note that the figures are for descriptive purposes only.

1. System Summary

Figure 1:
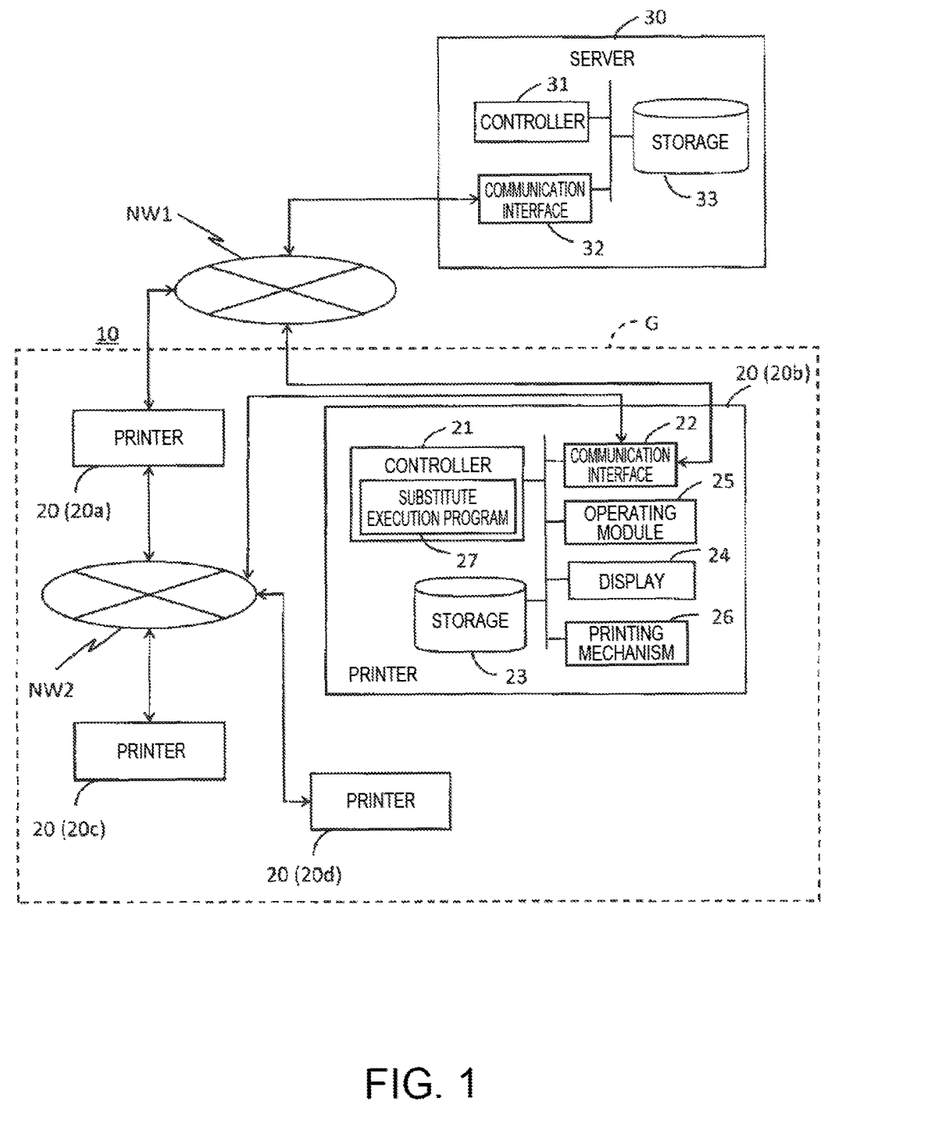
FIG. 1 schematically illustrates the configuration of a system according to a preferred embodiment of the invention.

FIG. 1 schematically illustrates the configuration of a system 10 according to a preferred embodiment of the invention. This system 10 includes multiple printers 20 as examples of printing devices, and a server 30 that acquires specific information (printer information) about the printers 20, and manages the system 10. The multiple printers 20 are identified by reference numerals 20a, 20b, 20c, 20d to identify individual printers as needed. The number of printers 20 is obviously not limited to four as shown in FIG. 1. A printer 20 in this example is a device that functions at least as a printer, but may be a multifunction device also having other functions, such as a scanner or fax machine functions. The printer 20 may also be a desktop printer, or a portable printer (mobile printer). The printer 20 may also be referred to as an image forming device.

In this embodiment of the invention, at least two printers 20 of the multiple printers 20 (the multiple printers 20 forming group G in this example) are connected to the network NW1 and have the ability to communicate with the server 30. In the example in FIG. 1, at least printer 20a and printer 20b can connect to the network NW1. The network NW1 may include a local area network (LAN) or the Internet. While not shown in the figures, a terminal used by an operator associated with a business (such as the printer manufacturer) the manages and operates the system 10 is also connected to the server 30. This terminal may be a personal computer (PC), and the operator can view information stored and processed by the server 30 through the terminal.

In this system 10 the multiple printers 20 also have the ability to connect to another network NW2 and communicate with each other. This network NW2 may be a part of a LAN included in the network NW1, or a corporate intranet independent of the network NW1. Networks NW1 and NW2 may also be wired networks or wireless networks.

FIG. 1 also illustrates the internal configuration of printer 20b of the multiple printers 20, but each printer 20 has a controller 21, communication interface 22, storage 23, display 24, operating module 25, and printing mechanism 26. The controller 21 is embodied by one or more IC devices including a CPU, ROM, and RAM, for example, or other type of memory device. The controller 21 controls the operation of the printing mechanism 26 and other components of the printer 20 by the CPU executing processes according to firmware or program stored in ROM using RAM as working memory, for example.

The communication interface 22 is a general term for an interface for communicating with external devices through network NW1 and network NW2 according to a specific communication protocol.

The storage 23 is embodied by a hard disk drive, flash memory, or other storage device, is as part of the controller 21.

The display 24 is a means for visually displaying information, such as a liquid crystal display (LCD) panel or OLED panel. The display 24 may include a display device and drive circuit for driving the display.

The operating module 25 is a means enabling user input operations, and may be a touch panel, physical buttons, or a keyboard, for example. The display 24 may also function as such a touch panel. The display 24 and operating module 25 may together be referred to as an operating panel.

The printing mechanism 26 is a mechanism for printing based on print data, and in this example prints by an inkjet printing method. The printing method used by the printing mechanism 26 is not limited to inkjet printing, and an electrophotographic printing method may be used. The configuration of the printing mechanism 26 is known from the literature, and further detailed description thereof is omitted.

The server 30 includes a controller 31, communication interface 32, and storage 33. The server 30 is embodied by one or more information processing devices that function as a server.

The controller 31 is embodied by one or more IC devices including a CPU, ROM, and RAM, for example, or other type of memory device. The controller 31 controls the operation of the server 30 by the CPU executing processes according to firmware or program stored in ROM using RAM as working memory, for example.

The communication interface 32 is an interface for communicating with external devices through network NW1 according to a specific communication protocol.

The storage 33 is basically the same type of device as the storage 23 described above. Printer information sent from the printers 20 is stored in the storage 33.

In this example, the multiple printers 20a, 20b, 20c, 20d that are connected to each other on the network NW2 are referred to as a group G of printers 20 (a printer 20 group G). Only one group G is shown in FIG. 1, but multiple groups G may be connected to the server 30. One printer 20 in the group G is referred to as the representative printer, and is distinct from the printers 20 other than the representative printer 20 in the group G. The representative printer 20 is a particular printer in the group G that is designated to collect printer information from each of the other printers 20 in the group G and is enabled to send (upload) the printer information to the server 30. The representative printer 20 may be any printer 20 capable of communicating with the server 30 over the network NW1, and in this example printer 20a is designated the representative printer 20a.

2. Information Uploading Process

Figure 2:
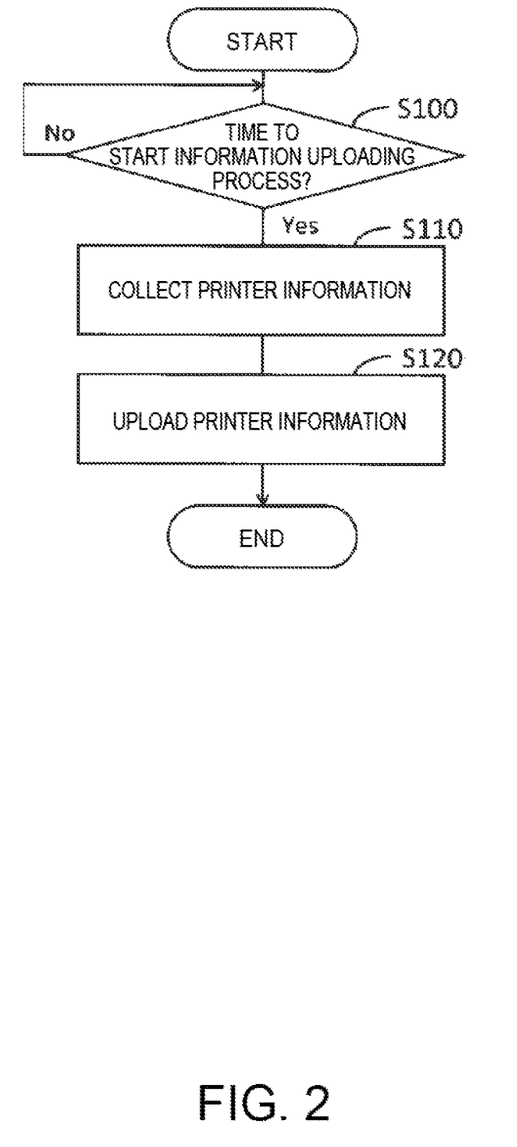
FIG. 2 is a flow chart of an information uploading process.

The information uploading process executed by the representative printer 20a is summarized below.

FIG. 2 is a flow chart of the information uploading process executed by the printer 20a. The representative printer 20a constantly monitors if the time to start the information uploading process has come, and if the time to start the process has come (step S100: Yes) goes to step S110. The representative printer 20a regularly executes the information uploading process according to a predetermined schedule, such as once a day. When this scheduled time arrives, the representative printer 20a goes from step S100 to step S110.

In step S110, the representative printer 20a communicates through network NW2 with each printer 20b, 20c, 20d in group G, and collects printer information from each printer 20b, 20c, 20d. More specifically, the representative printer 20a sends a multicast request (printer information request) for printer information through the network NW2, or sends a unicast for printer information sequentially to each printer 20b, 20c, 20d in the group G. In response to receiving the request, each printer 20b, 20c, 20d other than the representative printer 20a generates the most recent printer information for each device at that time, and sends the printer information through the network NW2 to the representative printer 20a.

The printer information is, for example, a group of information including status information, error information, and consumables information of the printer 20. In this example, the printer information specifically includes consumables information.

The consumables information is information related to consumables used by the printer 20 (printing mechanism 26) for printing, such as the print medium, ink, or toner; and more specifically may include the cumulative number of pages printed by the printing mechanism 26, the amount of ink remaining in the ink cartridges (or ink bottles or ink packs, for example) of the printing mechanism. 26, ink consumption information such as the number of shots of each color of ink ejected from the nozzles, the ink cartridge replacement history, the amount of remaining toner in the printing mechanism 26, toner consumption information, or toner replacement history. This consumables information is an example of information the server 30 requires to calculate an invoice amount (information used for a billing calculation). The billing calculation of the server 30 is described below.

The representative printer 20a collates the printer information collected from each printer 20b, 20c, 20d in the group G, and its own printer information at that time, as the most recent printer information, and sends the printer information for the group G (as a group printer information report) through the network NW1 to the server 30 (step S120). This completes the information uploading process of the representative printer 20a.

On the server 30 side, the printer information transmitted from the representative printer 20a for each group G by the information uploading process described above is stored in the storage 33 relationally to information identifying the group G (such as the serial number of the representative printer 20 for each group G).

Executing the information uploading process on a schedule is described above as a typical example, but the process need not be executed regularly. In addition, executing the information uploading process regularly (on a schedule) is not limited to executing the process at an equal time interval.

3. Substitute Information Uploading Process

As described above, in principle the printer 20 of the group G runs the information uploading process related to the same group G. However, there are situations in which the printer 20 cannot execute the information uploading process for some reason. For example, the printer 20 cannot execute the information uploading process at the scheduled time if the printer 20 malfunctions, the printer 20 connection to the network NW1 or network NW2 is interrupted, or the printer 20 power is not on. When this happens in this embodiment, another printer 20 in the same group G as the printer 20 executes the information uploading process instead of the representative printer 20a that is unable to execute the information uploading process.

A printer 20 that can execute the information uploading process instead of the representative printer 20a is a printer 20 in the same group G as the representative printer 20a and is connected to the network NW1. In the example in FIG. 1, in addition to the representative printer 20a, printer 20b also has an interface for connecting to the network NW1, and is the substitute printer that executes the information uploading process instead of the representative printer 20a in the operation described below. A program enabling substitute execution of the information uploading process (referred to below as the substitute execution program 27) is previously installed to the controller 21 of the printer 20b. It will also be obvious that if printer 20c or printer 20d is also connected to the network NW1, either printer 20c or printer 20d may likewise execute the information uploading process based on the substitute execution program 27.

Figure 3:
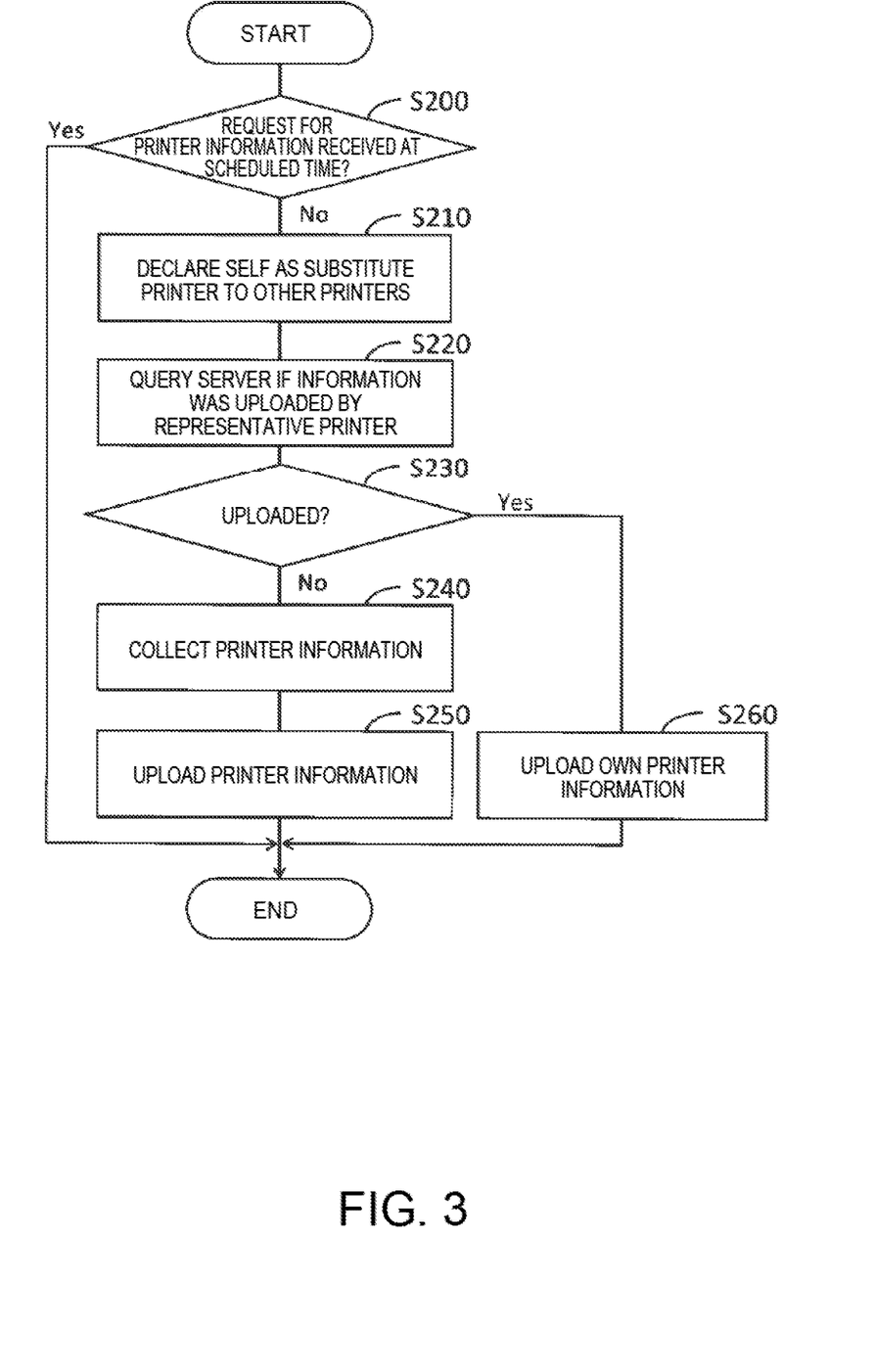
FIG. 3 is a flow chart of an information uploading substitution process according to a first embodiment of the invention.

FIG. 3 is a flow chart of the substitute information uploading process the controller 21 of the printer 20b executes according to the substitute execution program 27. The process described below based on FIG. 3 is also referred to as the first embodiment. The first embodiment and second embodiment are also specific examples of an information collection and transmission method.

The controller 21 monitors if a request for printer information was received from the printer 20a at a scheduled time (step S200). As described above, the representative printer 20a, when executing the information uploading process (FIG. 2), broadcasts a request for printer information at a predetermined scheduled time to the group G. The controller 21 stores the time when a request for printer information was received from the printer 20a as the scheduled time, and thereafter determines whether or not a request for printer information was received from the representative printer 20a at the scheduled time.

Suppose, for example, that the controller 21 received a request for printer information from the representative printer 20a at noon (12:00) on a particular day. The controller 21 then stores noon as the scheduled time, and from the next day determines whether or not a request for printer information was received from the representative printer 20a at the scheduled time (noon).

For example, if the controller 21 receives a request for printer information from the representative printer 20a a specific time (such as several minutes) before the scheduled time, the controller 21 determines the request for printer information was received from the representative printer 20a at the scheduled time (step S200: Yes), and ends the process shown in the flow chart in FIG. 3. In this event, the information uploading process is executed by the representative printer 20a as expected. In other words, the controller 21 (of printer 20b) can simply return the printer information for printer 20b to the representative printer 20a in response to the request for printer information from the representative printer 20a.

However, if the controller 21 cannot receive a request for printer information from the representative printer 20a even though the specific time has past since the scheduled time, the controller 21 determines a request for printer information was not received from the representative printer 20a at the scheduled time (step S200: No) and goes to step S210. This event corresponds to the representative printer 20a being unable to execute the information uploading process for some reason. When executing step S200, the controller 21 may also be said to function as a decision unit that determines whether or not a request for specific information (printer information) was received from a specific printing device (representative printer 20*a*) at a specific time.

In step S210, the controller 21 declares to the other printers 20 in the same group G that it (that is, printer 20*b*) will send the printer information to the server 30, that is, will be the substitute printer that executes the information uploading process. In this case, the controller 21 broadcasts the substitute printer declaration (declaration report) over the network NW2, or sequentially unicasts the declaration to the other printers 20*a*, 20*c*, 20*d* in the same group G.

Note that a printer declaring it will be the substitute printer may also be referred to as reporting it will be the substitute printer, or sending a report that it will be the substitute printer.

A printer 20 that receives the declaration report cannot become the substitute printer for at least that day. In other words, the controller 21 of printer 20*b* transmits the declaration report when it determines No in step S200 and has not received a declaration report from another printer 20 in that group G. By making this declaration, multiple printers 20 in the same group G can be prevented from becoming substitute printers at the same time.

After making the declaration, the controller 21 queries the server 30 over the network NW1 to determine whether or not printer information was uploaded from the representative printer 20*a* to the server 30 (step S220). For example, the controller 21 reports the serial number of the representative printer 20*a* in the same group G as, and the scheduled time when printer information should have been uploaded from the representative printer 20*a*, to the server 30, and asks the server 30 whether or not printer information was uploaded from the representative printer 20*a* that day at the scheduled time.

The server 30 sends, through the network NW1, a response to the query to the printer 20 (substitute printer 20*b*) that sent the query.

The controller 21 that received the response to the query from the server 30 then branches the process based on whether the response is that printer information was uploaded from the representative printer 20*a* to the server 30, or the response is that printer information was not uploaded (step S230). In this case, the response is that printer information was not uploaded (step S230: No), control goes to step S240; if the response is that printer information was uploaded (step S230: Yes), control goes to step S260 and the process of the flow chart in FIG. 3 ends.

If the response to the query is that printer information was uploaded, the controller 21 can determine that the representative printer 20*a* successfully collected the printer information from the printers 20*c*, 20*d* other than itself (printer 20*b*) in the group G, and uploaded the printer information to the server 30. In step S260, the controller 21 therefore uploads the latest printer information for itself (printer 20*b*) through the network NW1 to the server 30. In this case, the server 30 stores the printer information uploaded for the group G from the representative printer 20*a*, and the printer information uploaded from the printer 20*b* that is not the representative printer of the group G, relationally to the information identifying the group G in the server 30 storage 33.

In step S240, the controller 21 communicates through the network NW2 with each of the other printers 20*a*, 20*c*, 20*d* in the group G, and collects printer information from each of the printers 20*a*, 20*c*, 20*d*. In other words, the substitute printer 20*b* sends a request for printer information by multicast or unicast through the network NW2 to other printers in the group G. In response to the request, the printers 20*a*, 20*c*, 20*d* other than the substitute printer 20*b* generate the latest printer information for themselves at that time, and send the generated printer information through the network NW2 to the substitute printer 20*b*. When step S240 executes, however, the chance that printer information will be sent from the representative printer 20*a* to the substitute printer 20*b* is low.

In this way, at least when step S240 executes, the controller 21 may be said to function as an information collection device that collects printer information from each printer with which it can communicate when the request for printer information is not received from the representative printer at the scheduled time.

In step S250, the controller 21 compiles the printer information successfully collected from other printers 20 in step S240, and the latest printer information for itself (printer 20*b*), as the printer information for one group, and sends the compiled printer information through the network NW1 to the server 30. The controller 21 then ends the process shown in FIG. 3.

The server 30 then stores the printer information uploaded from a printer 20*b* other than the representative printer of the group G in the storage 33 relationally to information identifying the group G.

When executing step S250, the controller 21 may be said to function as an information transmission device that sends printer information collected from other printers (and printer information for its own printer) to an external server.

Figure 4:
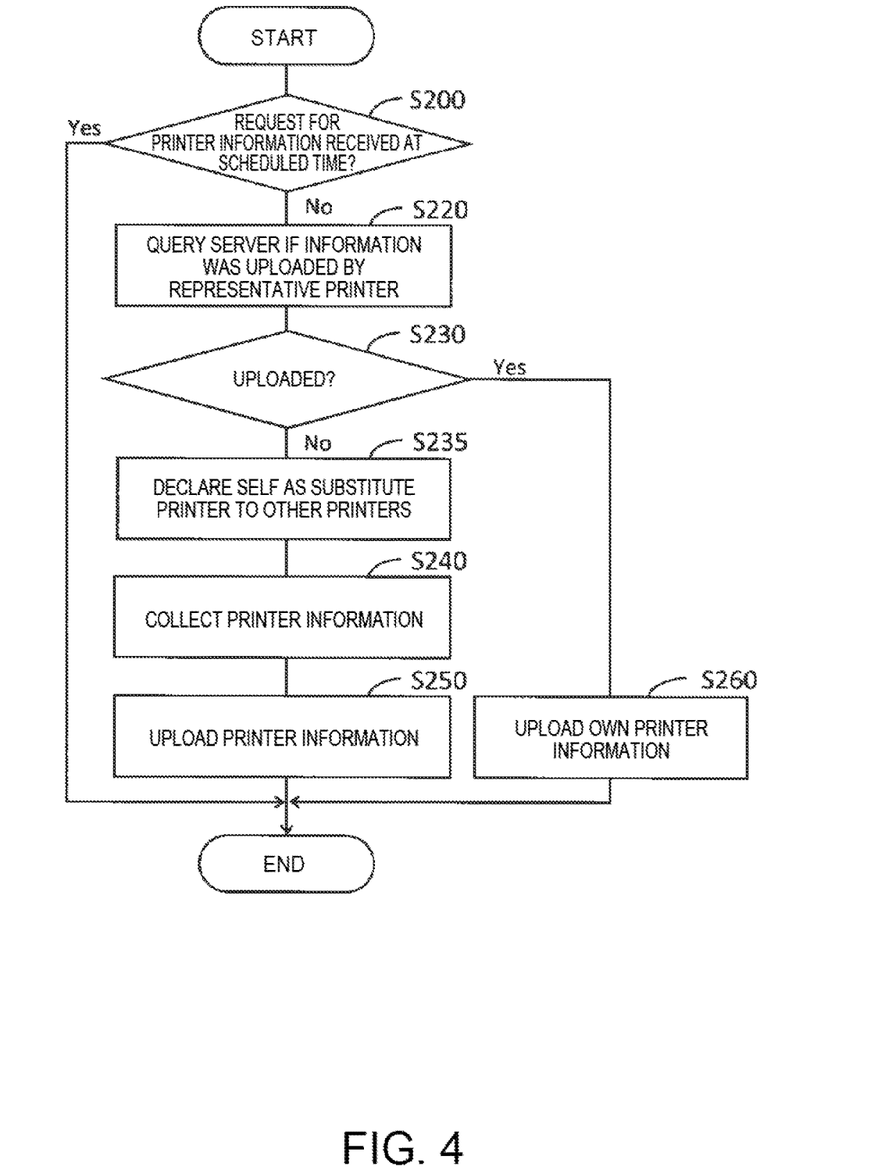
FIG. 4 is a flow chart of an information uploading substitution process according to a second embodiment of the invention.

FIG. 4 is a flow chart of a substitute information uploading process that is executed by the controller 21 of the printer 20*b* according to the substitute execution program 27, and differs from the process shown in FIG. 3. The process described with reference to FIG. 4 may also be referred to as a second embodiment. The differences between this second embodiment and the first embodiment are described below.

In the second embodiment, the timing for broadcasting the declaration differs from the first embodiment.

After returning No in step S200, the controller 21 queries the server 30 through the network NW1 to determine whether or not printer information was uploaded from the representative printer 20*a* to the server 30 (step S220). The controller 21 then branches the process according to the response to the query received from the server 30 (step S230), and if the response is that printer information was not uploaded (step S230: No), control goes to step S235.

In step S235, the controller 21 declares to the other printers 20 in the same group G that printer 20*b* will send the printer information to the server 30, that is, printer 20*b* will be the substitute printer that executes the information uploading process. The process of step S235 is the same as step S210 (FIG. 3). After broadcasting the declaration, the controller 21 then executes steps S240 and S250, and ends the process of the flow chart in FIG. 4.

Note that if the controller 21 receives a declaration from another printer 20 in the group G before the controller 21 sends the declaration, the controller 21 does not execute steps S240 and S250 (does not become the substitute printer). In other words, by making this declaration in the second embodiment, multiple printers 20 in the same group G can also be prevented from becoming substitute printers at the same time.

Note that a configuration that executes steps S240 and S250 immediately after No is determined in step S200 (that is, steps S210, S220, S230, S235 are not executed) are also included in the embodiments described in FIG. 3 and FIG. 4.

4. Summary

In the embodiments described above, the printer 20 determines at a specific time whether or not a request for specific information (printer information) was received from a specific printing device (representative printer 20), and if a request was not received at the specific time, another printer 20 capable of communicating collects the printer information from the other printers 20, and sends the collected printer information and its own printer information to an external server 30. Thus comprised, a substitute printer 20 can collect printer information from other printers 20 and send the printer information to a server 30 when the representative printer 20 is unable for some reason to collect the printer information. In other words, the information uploading process is executed by a printer 20 other than the representative printer 20. As a result, the server 30 can appropriately store printer information by printer 20 group G unit.

When the printer 20 in this embodiment determines a request was not received at the specific time, the printer 20 queries the server 30 to determine whether or not printer information was uploaded from the representative printer 20 to the server 30, and if the response from the server 30 is that information was not uploaded, the printer 20 executes the information uploading process instead of the representative printer 20. This prevents multiple printers 20 (the representative printer 20 and a printer 20 that is not the representative printer 20) in the same group G of the system 10 redundantly executing the same process.

The consumables information included in the printer information in this example is information required by the server 30 to calculate an invoice amount. In this system 10, a business (server 30) calculates and bills an invoice amount by printer 20 group G units at a specific interval (such as monthly). In the example in FIG. 1, the business (server 30) calculates an invoice amount according to the total amount of consumables used for printing by the printers 20a, 20b, 20c, 20d during the specific interval (billing period) based on the printer information (consumables information) for each group G of printers 20a, 20b, 20c, 20d, and bills the user of the group G of printers 20a, 20b, 20c, 20d for the total calculated invoice amount.

A group G in this example is therefore a group of printers 20 for which a single collective invoice is issued.

The printer 20 (information collection device) that substitutes for another printer to execute the information uploading process is another printer 20 in the same group G of printers 20 for which a single invoice is issued, and collects printer information for other printers 20 in the same group G. When the representative printer 20 that normally collects and sends the information required to calculate an invoice for the group G is unable to send information to the server 30 for some reason, a different printer 20 in the same group G collects and transmits the information instead, thereby enabling the server 30 to appropriately calculate the invoice.

This embodiment describes a configuration in which when a printer 20b determines there was not a request for printer information from the representative printer 20, that printer 20b functions as a substitute printer to execute the information uploading process. However, the invention is not so limited. For example, if the representative printer 20 determines it is unable to communicate with the server 30, the representative printer 20 may request another printer 20b to upload the printer information, and when the other printer 20b receives the request, that printer 20b may function as the substitute printer. This example is not applicable when the reason the representative printer 20 cannot upload the printer information to the server 30 is because the representative printer 20 power is off, or the representative printer 20 cannot communicate with the other printer 20b. However, this configuration is applicable when the reason is that the representative printer 20 cannot communicate with the server 30, for example.

Note that from when the request is received from the representative printer 20 until the printer information is uploaded to the server 30, the printer 20b may display on the display 24 a message indicating that the printer 20b is functioning as the substitute printer.

When the printer 20b did not receive a request for printer information from the representative printer 20, or when the printer 20b receives a request to upload printer information from the representative printer 20, if the printer 20b is also unable to communicate with the server 30, the printer 20b may request another printer 20 in the group G that can communicate with the server 30 to collect the specific information from the other printers 20, that is, request yet another printer 20 to function as the substitute printer to execute the information uploading process.

When the printer 20b did not receive a request for printer information from the representative printer 20 at the specific time, or when the printer 20b is requested by the representative printer 20 to upload the printer information, the printer 20b determines if it is able to communicate with the server 30 by, for example, attempting to actually communicate with the server 30. If the printer 20b is unable to communicate with the server 30 (for example, cannot execute the query in step S220), the printer 20b queries other printers 20c, 20d in the group G to determine if one can communicate with the server 30. The printer 20b then requests one of the other printers 20 that returns, in response to the request, a reply indicating that it can communicate with the server 30 to act as the substitute printer executing the information uploading process. The other printer 20 that is thus requested then executes the information uploading process.

Note that the controller 21 (first processor) in the above embodiments is embodied by one or multiple integrated circuit devices. The controller 21 (first processor) may include, for example, one or more CPUs, one or multiple ASIC chips, or a combination thereof.

Note also that the controller 31 (second processor) in the above embodiments is embodied by one or multiple integrated circuit devices. The controller 31 (second processor) may include, for example, one or more CPUs, one or multiple ASIC chips, or a combination thereof.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A printing device configured to:
   determine that a request for specific information is not received from a specific printing device at a specific time;
   query, responsive to the determination, an external server as to whether or not the specific information was transmitted from the specific printing device to the server;
   receive a reply indicating that the specific information was not transmitted from the specific printing device to the server;

collect, responsive to receiving the reply, from at least one other printing device, specific information about at least one other printing device; and transmit the specific information about the at least one other printing device that was collected to the external server.

2. The printing device described in claim 1, wherein the printing device is further configured to transmit, to the external server, information about the printing device that collected the specific information about the at least one other printing device.

3. The printing device described in claim 1, wherein the printing device is further configured to declare, responsive to the determination that the request for specific information was not received from the specific printing device at the specific time, to the at least one other printing device that the printing device making the declaration will transmit information to the server, and then query the server.

4. The printing device described in claim 1, wherein the printing device is further configured to declare, responsive to receiving the reply indicating that the specific information was not transmitted from the specific printing device to the server, to the at least one other printing device that the printing device making the declaration will transmit information to the server, and then collect the specific information about the at least one other printing device.

5. The printing device described in claim 1, wherein:
the specific information is information for calculating an invoice amount.

6. The printing device described in claim 1, wherein the printing device is further configured to:
determine that the printing device is unable to communicate with the server, and
request that another printing device that can connect communicatively with the server collect the specific information.

7. An information collection and transmission method executed by a printing device, and comprising:
determining that a request for specific information is not received from a specific printing device at a specific time;
querying, responsive to the determination, an external server as to whether or not the specific information was transmitted from the specific printing device to the server;
receiving a reply indicating that the specific information was not transmitted from the specific printing device to the server;
collecting, responsive to receiving the reply, specific information about at least one other printing device from the at least one other printing device; and
transmitting the specific information that was collected to the external server.

8. The information collection and transmission method executed by a printing device described in claim 7, further comprising:
declaring, responsive to the determination that the request for specific information was not received from the specific printing device at the specific time, to the at least one other printing device that the printing device making the declaration will transmit information to the server, and
then querying the server.

9. The information collection and transmission method executed by a printing device described in claim 7, further comprising:
declaring, responsive to receiving the reply indicating that the specific information was not transmitted from the specific printing device to the server, to the at least one other printing device that the printing device making the declaration will transmit information to the server, and
then collecting the specific information from the at least one other printing device.

10. The information collection and transmission method executed by a printing device described in claim 7, wherein:
the specific information is information for calculating an invoice amount.

11. The information collection and transmission method executed by a printing device described in claim 7, further comprising:
determining that the printing device is unable to communicate with the server; and
requesting that another printing device that can connect communicatively with the server collect the specific information.

* * * * *